United States Patent [19]
Donner

[11] 3,871,615
[45] Mar. 18, 1975

[54] SOLENOID OPERATED WEDGE GATE VALVE
[75] Inventor: Verne P. Donner, Palatine, Ill.
[73] Assignee: Deltrol Corp., Bellwood, Ill.
[22] Filed: Feb. 19, 1974
[21] Appl. No.: 443,763

[52] U.S. Cl. .................... 251/129, 251/77, 251/327
[51] Int. Cl. ............................................ F16k 31/06
[58] Field of Search .............. 251/129, 327, 328, 77

[56] References Cited
UNITED STATES PATENTS
| 802,959 | 10/1905 | Waterman | 251/77 |
|---|---|---|---|
| 2,343,806 | 3/1944 | Scofield | 251/77 |
| 2,626,775 | 1/1953 | Lange et al. | 251/328 |
| 3,469,818 | 9/1969 | Cowan | 251/327 X |

FOREIGN PATENTS OR APPLICATIONS
| 362,283 | 7/1962 | Switzerland | 251/129 |
|---|---|---|---|
| 921,214 | 3/1963 | United Kingdom | 251/328 |

Primary Examiner—Arnold Rosenthal
Attorney, Agent, or Firm—John L. Harris

[57] ABSTRACT

A wedge type solenoid operated gate valve provided with elastomeric valve seat inserts insertable through the inlet and outlet ports and held in place by spuds serving as external connectors. The inlet and outlet passages in the valve body are inclined relative to each other providing wedging valve seats with inserts of symetrical configuration. Hammer action by the solenoid is provided to break the wedge gate valve member loose from its seats.

1 Claim, 5 Drawing Figures

PATENTED MAR 18 1975 3,871,615

SOLENOID OPERATED WEDGE GATE VALVE

BACKGROUND OF THE INVENTION

This invention relates to gate valves and to solenoid operation thereof.

Wedge type gate valves are well known in the art. This type of valve has the advantage of providing high seating pressures due to the wedging action. However machining of the valve seats is almost impossible which requires the use of valve seat inserts. The easiest to install are ones inserted from outside the valve body through the inlet and outlet ports as shown in the Vaudreuil, U.S. Pat. No. 3,179,372. However this arrangement requires the inserts to be tapered to conform to the wedge angle of the gate valve. This involves higher mould cost than non-tapered inserts. It also requires careful alignment of the inserts in the valve body to obtain the proper wedge angle.

An undesirable characteristic of wedge type gate valves is that the same wedging action that gives high seating pressures also requires more force to unseat the valve. This has discouraged solenoid operation of such valves as a solenoid has minimum pull at the very time that maximum pull is needed.

BRIEF SUMMARY OF INVENTION

The primary object of the invention is to provide a wedge type gate valve in which the valve seat inserts are installed through the valve ports and in which the inserts are non-tapered or symmetrical.

This is achieved by the provision of a special valve body in which the inlet and outlet passages approach each other at a slight angle, thus providing a wedge shaped space for the valve member.

A further object of the invention is the provision of a solenoid operator for the valve which provides for hammer action between the valve member and solenoid plunger, and which requires no additional parts.

This is achieved by a T-shaped slot in the plunger which receives a T-shaped head formed on the valve member, the head being insertable through the side of the plunger.

Other objects will appear from the following description and appended claims.

DETAILED DESCRIPTION OF INVENTION

Figure 1:
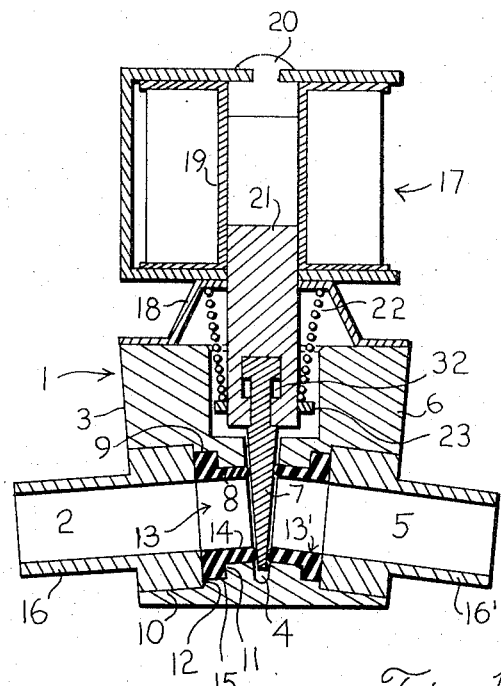
FIG. 1 is a sectional elevation of a valve embodying the preferred form of the invention.

Referring to FIG. 1, reference character 1 indicates generally a valve body having an inlet port or passage 2 leading from side 3 of the valve body to an internal valve chamber 4 inside the valve body. An outlet passage 5 leads from the opposite side 6 of the valve body to internal chamber 4. Passages 2 and 5 thus enter from opposite sides of the valve body and as shown are at a slight angle to each other, providing a V or wedge shaped space between their ends, accomodating a wedge shaped gate valve member 7. As shown, passages 2 and 5 are straight, which facilitates casting and the angle at which the passages approach each other through the valve body determines the angle of the wedge shaped space receiving the valve member.

Passage 2 is formed with three different diameter bores 8, 9, and 10. Diameter 8 is of relatively small crossection and is adjacent internal chamber 4. Diameter 9 is of larger crossection and is located outwardly from diameter 8, providing a shoulder 11. Diameter 10 is of still larger crossection and is outward from diameter 9, providing a shoulder 12.

Bores 8 and 9 receive a moulded valve insert 13 preferably of elastomeric material 50 to 90 DURD. Insert 13 is formed with an inner portion 14 having an external diameter conforming to bore 8 and extending into the internal chamber 4 for engagement with valve member 7. Preferably the inner end is rounded off where it is engaged by the valve member. Insert 13 is also formed with a larger diameter outer portion 15 which is located in bore 9, this providing a shoulder which bears against the locating shoulder 11 in the valve body. An external connector or spud 16 is pressed into bore 10 into contact with shoulder 12. This serves to maintain insert 13 in place against shoulder 11 and insure that its inner end is properly located relative to the valve member. Outlet passage 5 is formed in identical manner and receives an identical insert 13' and spud 16'.

From the foregoing it will be apparent that inserts 13 and 13' serve as a means for terminating the inlet and outlet passages with a wedge shaped space therebetween which receives the gate valve member 7. The arrangement in which the straight line passages approach each other at a predetermined angle provides the wedge shaped gate valve space while permitting the passages to be straight and the inserts to be symmetrical. The symmetrical insert construction reduces moulding costs as compared with tapered inserts. It also facilitates valve assembly as no aligning of the insert in the valve body is required. The inserts are simply pushed in place and the connectors pressed in behind them. The straight line passages also facilitates casting of the valve body as no complicated coreing is needed.

The valve member 7 is actuated in the opening direction by means of a solenoid having a coil assembly 17 mounted on a skirt 18 suitably attached to the valve body. The coil assembly is of any suitable construction and includes the usual frame, plunger guide 19 and backstop 20. Located in the plunger guide 19 is a plunger 21 which is biased downwardly by a spring 22 having its upper end bearing on the top of skirt 18 and its lower end bearing on a ring 23 attached to the lower end of the plunger.

Figure 2:
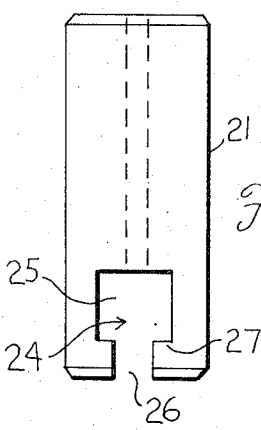
FIG. 2 is a side view of the plunger and slot.
Figure 3:
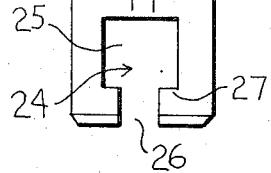
FIG. 3 is an end view of the plunger and slot.

As shown more clearly in FIGS. 2 and 3 the lower end of the plunger is formed with a compound preferably T-shaped slot 24 having an upper enlarged portion 25 and a lower narrow portion 26, providing shoulder 27. This slot preferably extends completely across the plunger as shown in FIG. 3.

Figure 5:
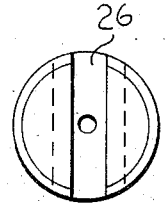
FIG. 5 is an end view of the valve member.
Figure 4:
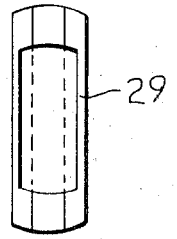
FIG. 4 is a side view of the valve member.

Also as shown in FIGS. 4 and 5, the top of the wedge shaped valve member is formed with a T-shaped head 28 having an enlarged upper head portion 29 and a narrow shank portion 30, providing shoulders 31. In assembly the head of the valve member is inserted sideways into the plunger slot, skirt 18 then being attached to the valve body. The depth of the valve member 7 should be but slightly smaller than the depth of valve chamber 4 so that the chamber serves as a guide for the valve member. Also the length of head 29 on the valve member should be smaller than the diameter of the plunger so that it cannot strike the plunger guide.

As shown in FIG. 1, the enlarged slot 25 in the plunger 21 is considerably higher than the head portion 29 of the valve member, leaving a lost motion or impact space 32 between shoulders 27 and 31 when the valve is closed. With the parts in positions shown in FIG. 1, the solenoid is deenergized. Spring 22 has pushed the plunger down causing its lower end to press against shoulder 32 of the valve member. The force of the spring is thus applied to the valve member urging it against its resilient wedging valve seats. At this time the inherent play at the free end of the solenoid plunger allows sideways movement of the valve member so that it can center itself between the seats and apply equal pressure to each seat without binding. Due to the wedging action, the seating force applied to each seat is considerably higher than the force applied to the plunger by the spring 22. Due to the resiliency of the elastomeric valve seats, a tight non-leaking closure is obtained. This same resiliency also limits the holding effect produced by the wedging action, insuring that this force cannot build up beyond the point where the solenoid cannot open the valve.

When the solenoid is energized the plunger rises against the action of spring 24. During the initial portion of its stroke, the plunger moves free of the valve member as the shoulders 27 of the plunger are moving through the impact space 32. During this free movement, the plunger picks up speed and develops inertia. When space 32 is taken up, shoulder 27 of the plunger strikes shoulder 31 of the valve member with a hammer action. This hammer action breaks the valve member loose from its seated position and the plunger continues to the top of the stroke withdrawing the valve member to its full open position.

From the foregoing it will be apparent that this invention provides a solenoid operated valve, incorporating the full flow advantages of a gate valve and still providing positive complete sealing and positive and dependable solenoid operation. It will further be apparent that the invention provides a wedge shaped gate valve having valve seat inserts of simple construction and which are easily mounted in the valve body through the inlet and outlet ports. It will also be apparent that the invention provides a simple and quickly assembled construction for attaching the valve member and solenoid plunger to give hammer action.

I claim:

1. A solenoid operated gate valve including a valve body formed with an inner chamber, an inlet passage extending from one side of the valve body to said chamber, an outlet passage extending from the opposite side of the valve body to said chamber, said passages extending generally toward each other, means whereby said passages are terminated inside the valve body providing a wedge shaped space therebetween, said terminating means including valve seat inserts of soft elastic material, a wedge shaped valve member generally conforming to said wedge shaped space and arranged to engage said valve seat inserts for stopping flow of fluid from the inlet passage to the outlet passage, means including a solenoid having a plunger member for withdrawing said wedge shaped valve member from said seats to allow flow of fluid, lost motion means connecting said plunger and valve member, said lost motion means permitting initial free movement of the plunger member to develop inertia, the plunger member striking the valve member with hammer action when the lost motion is taken up for breaking the valve member loose from its wedging seats, the resiliency of said seats being such as to limit the holding force produced by the wedging action of the valve member and seats to less than can be overcome by the solenoid plunger member, said lost motion means comprising a compound slot in one member having a first portion extending parallel with the direction of movement of said members and extending through the end of its associated member, said slot also having a second portion of greater width than the first portion providing an internal shoulder, both portions of the slot opening through at least one side of said associated member, the other member including a shank portion extending through the first portion of the slot and a head portion providing a shoulder engaging said internal shoulder, said shank and head portions being insertable sideways into the slot.

* * * * *